US009313395B2

(12) United States Patent
Iwabuchi

(10) Patent No.: US 9,313,395 B2
(45) Date of Patent: Apr. 12, 2016

(54) FOCUS EVALUATION VALUE GENERATION APPARATUS, FOCUS EVALUATION VALUE GENERATION METHOD, AND COMPUTER-READABLE MEDIUM STORING FOCUS EVALUATION VALUE GENERATION PROGRAM

(71) Applicant: SOCIONEXT INC., Yokohama-shi, Kanagawa (JP)

(72) Inventor: Hiroshi Iwabuchi, Sendai (JP)

(73) Assignee: SOCIONEXT INC., Yokohama (JP)

( * ) Notice: Subject to any disclaimer, the term of this patent is extended or adjusted under 35 U.S.C. 154(b) by 247 days.

(21) Appl. No.: 14/013,890

(22) Filed: Aug. 29, 2013

(65) Prior Publication Data

US 2014/0092294 A1 Apr. 3, 2014

(30) Foreign Application Priority Data

Oct. 3, 2012 (JP) .................................. 2012-221559

(51) Int. Cl.
*H04N 5/225* (2006.01)
*H04N 5/232* (2006.01)
*H04N 5/345* (2011.01)

(52) U.S. Cl.
CPC ......... *H04N 5/23212* (2013.01); *H04N 5/3456* (2013.01)

(58) Field of Classification Search
CPC ...... H04N 5/23212; G03B 13/36; G02B 7/28; G02B 7/36; G02B 7/365; G06T 5/003
USPC .................................................. 348/345–356
See application file for complete search history.

(56) References Cited

U.S. PATENT DOCUMENTS

| | | | | |
|---|---|---|---|---|
| 5,070,408 A | * | 12/1991 | Kikuchi et al. | ............... 348/356 |
| 5,369,435 A | | 11/1994 | Ueda | |
| 2003/0031375 A1 | * | 2/2003 | Enomoto | ...................... 382/255 |
| 2005/0270401 A1 | * | 12/2005 | Hatano | ........................ 348/335 |
| 2006/0110147 A1 | * | 5/2006 | Tomita et al. | ................... 396/55 |
| 2008/0131109 A1 | * | 6/2008 | Honjo et al. | .................. 396/123 |
| 2008/0166062 A1 | * | 7/2008 | Adams et al. | ................. 382/255 |
| 2011/0234899 A1 | * | 9/2011 | Kobayashi | ..................... 348/447 |
| 2014/0049688 A1 | * | 2/2014 | Ohnishi et al. | ................ 348/375 |

FOREIGN PATENT DOCUMENTS

| | | |
|---|---|---|
| JP | 3-1668 A | 1/1991 |
| JP | 3-289775 A | 12/1991 |
| JP | 2002-209135 A | 7/2002 |
| JP | 2008-304629 A | 12/2008 |

* cited by examiner

*Primary Examiner* — Twyler Haskins
*Assistant Examiner* — Dwight C Tejano
(74) *Attorney, Agent, or Firm* — Arent Fox LLP

(57) ABSTRACT

A focus evaluation value generation apparatus includes a low frequency image data generation unit configured to generate low frequency image data, a thinned image generation unit configured to generate thinned input image data and thinned low frequency image data, and a focus evaluation value generation unit configured to generate the focus evaluation value based on the thinned input image data and the thinned low frequency image data.

13 Claims, 13 Drawing Sheets

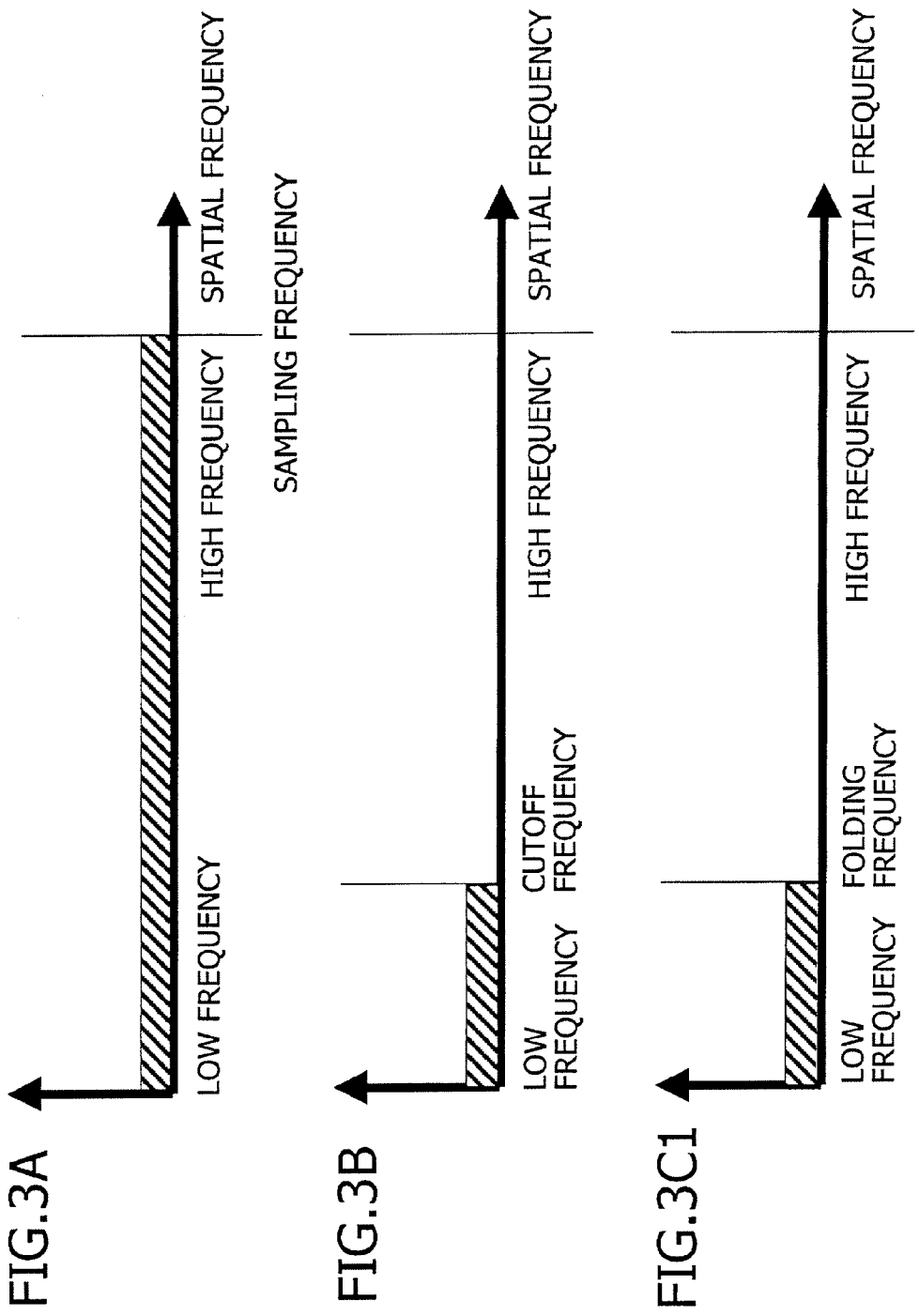

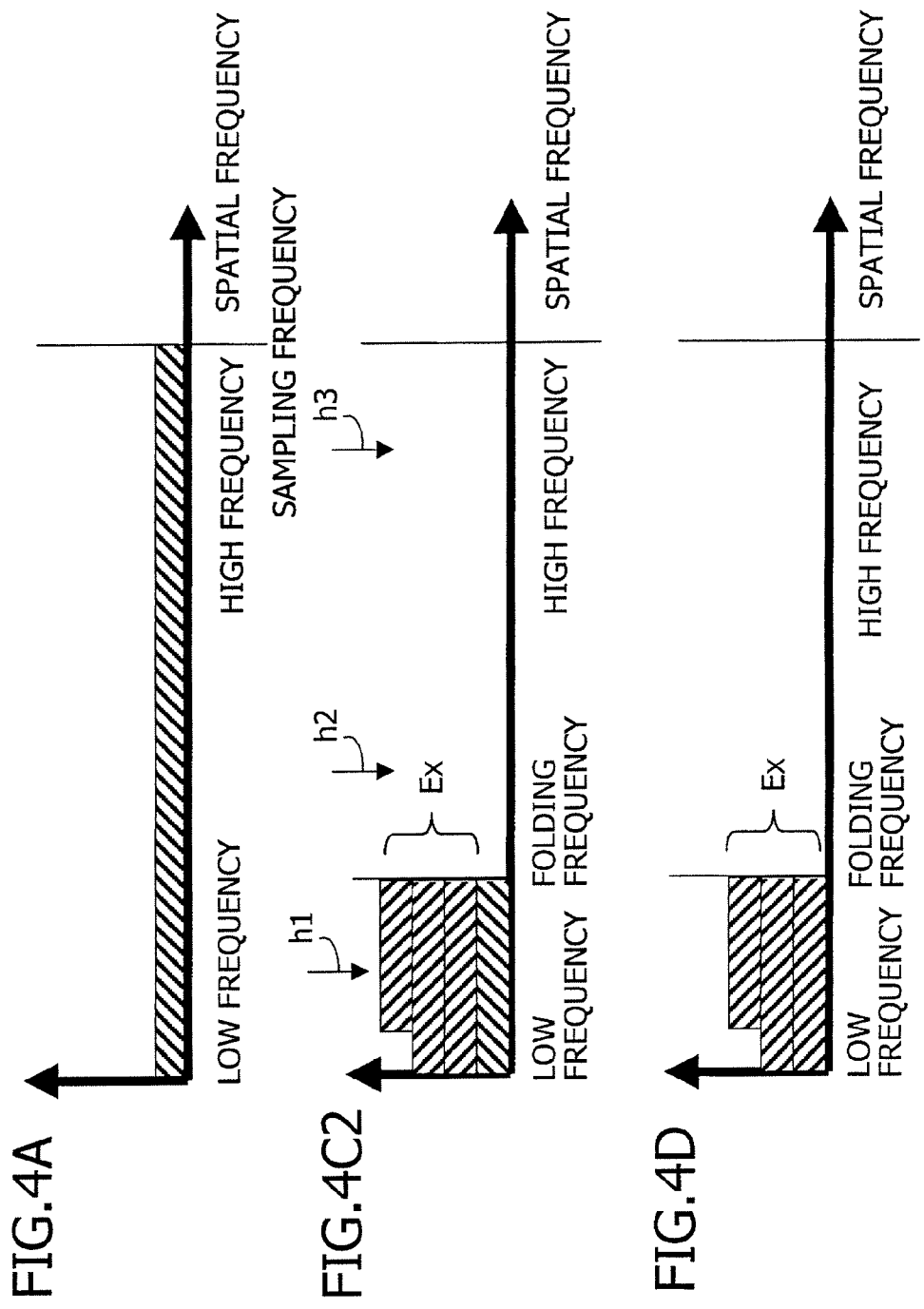

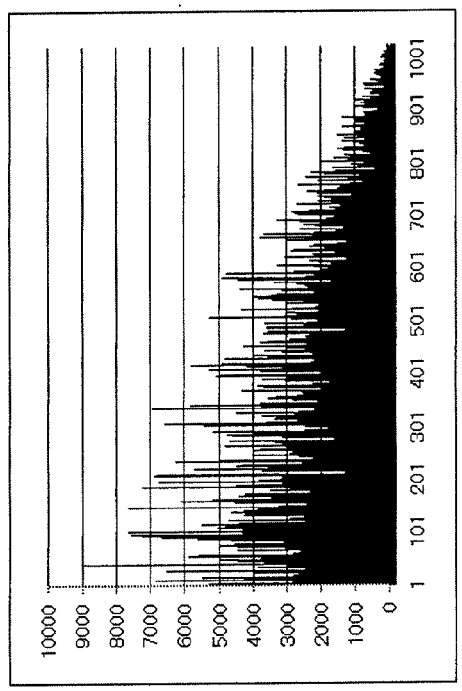
FIG.5A
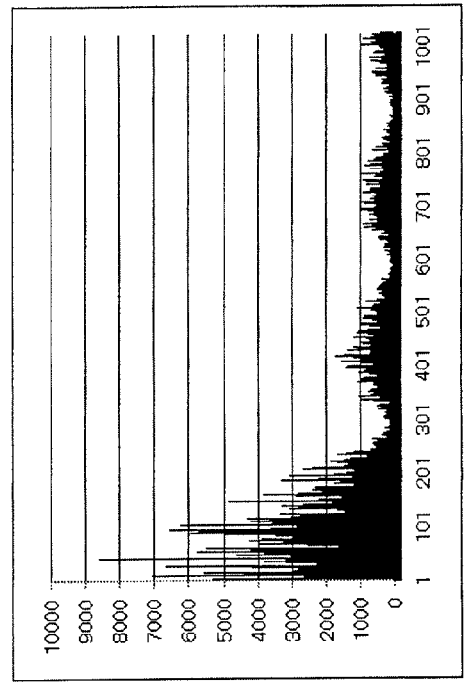
FIG.5B
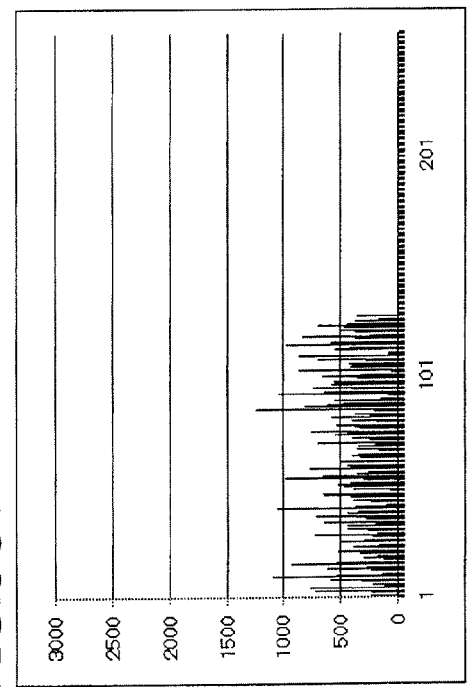
FIG.5C1

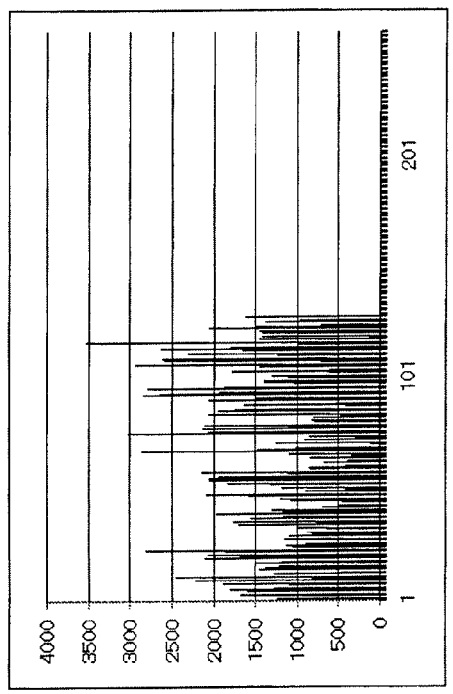
FIG.6D
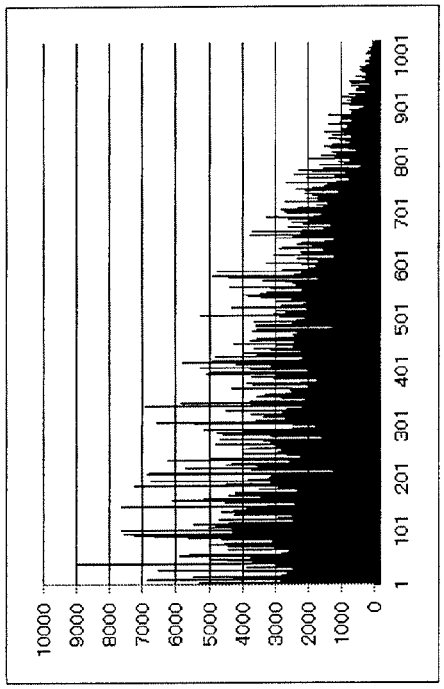
FIG.6A
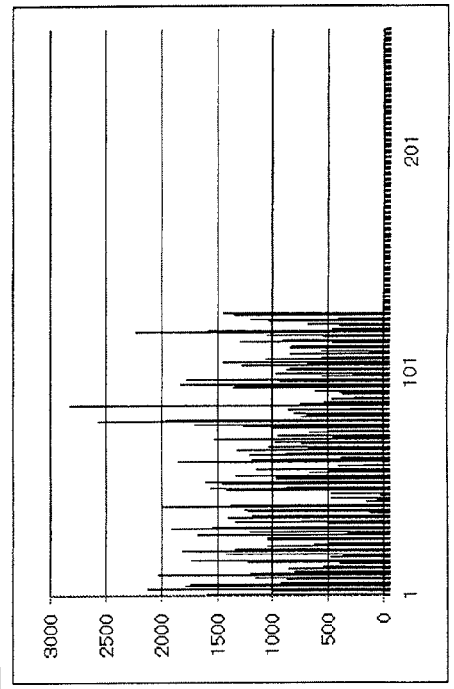
FIG.6C2

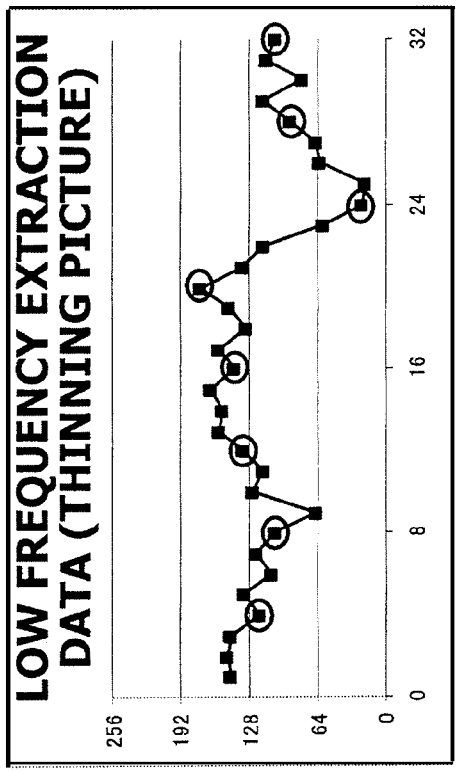
FIG.8B'
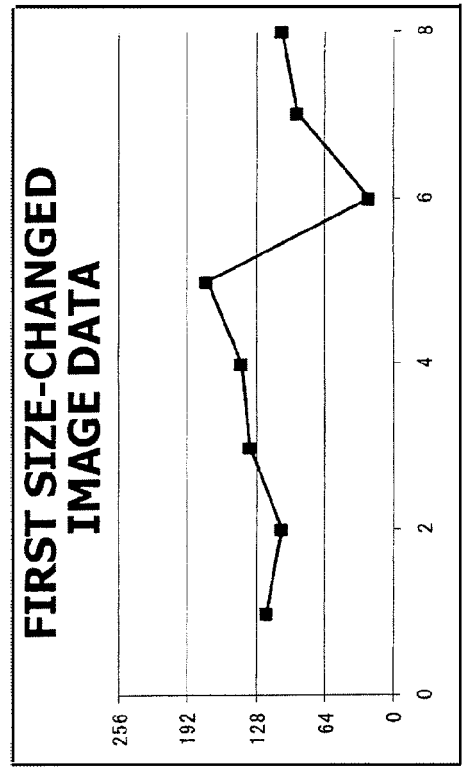
FIG.8C1

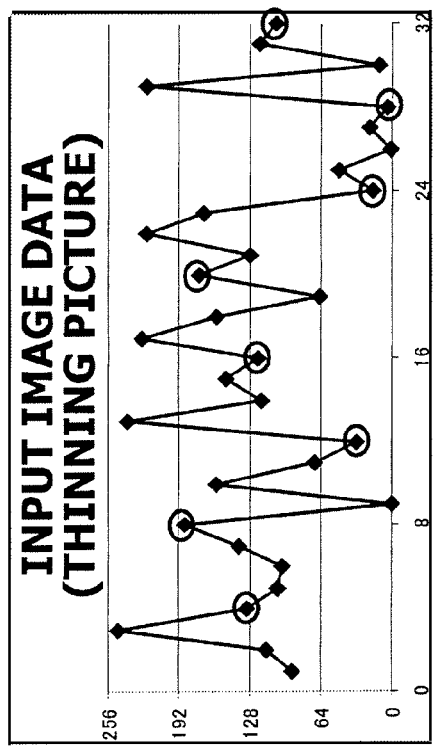
FIG.9A'
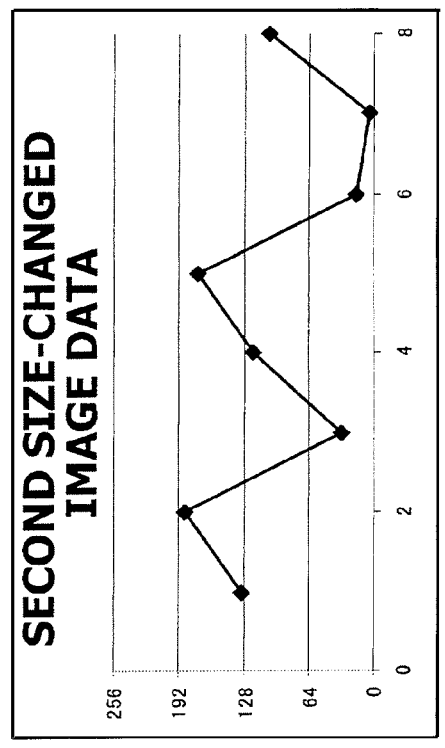
FIG.9C2

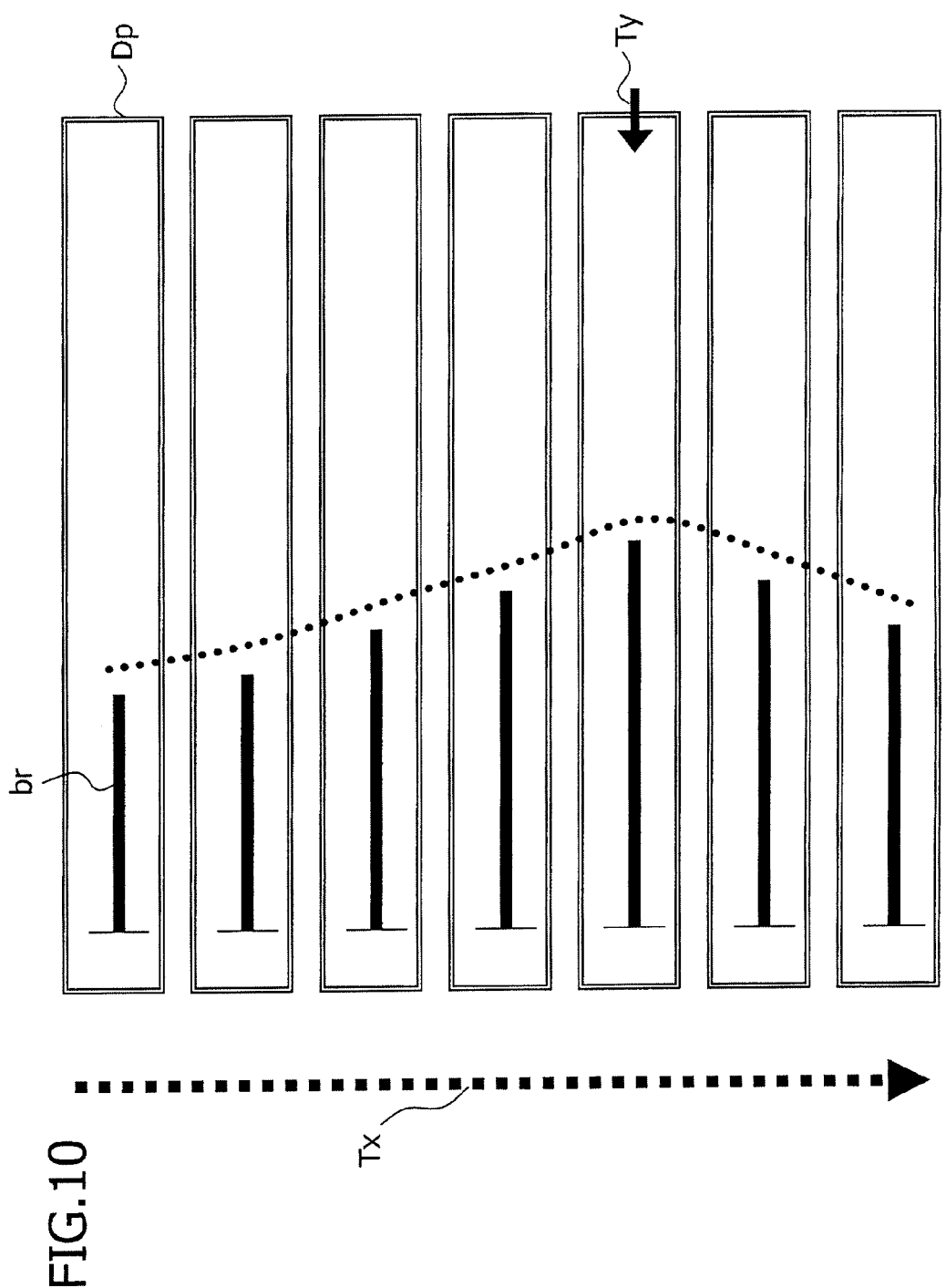

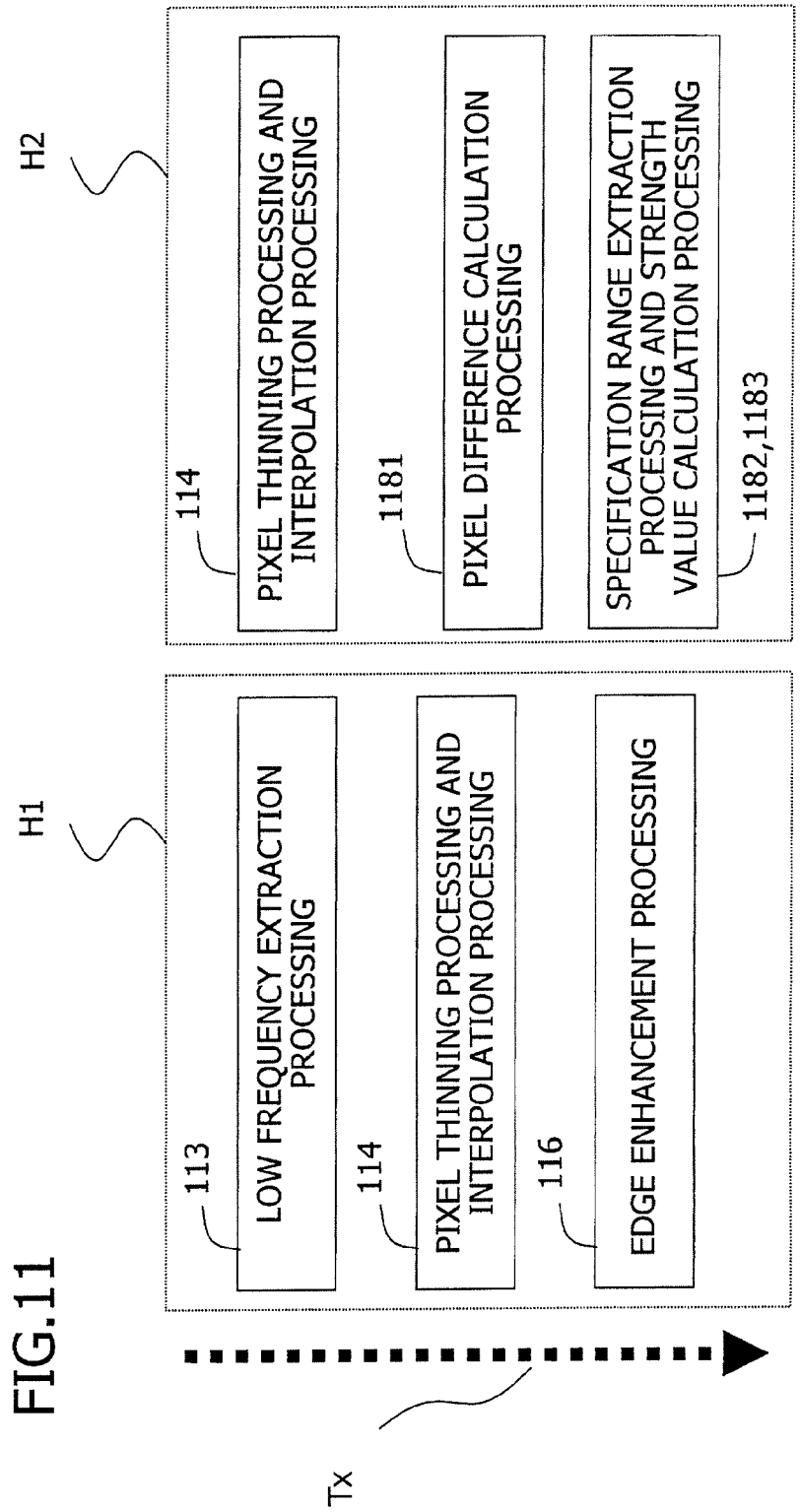

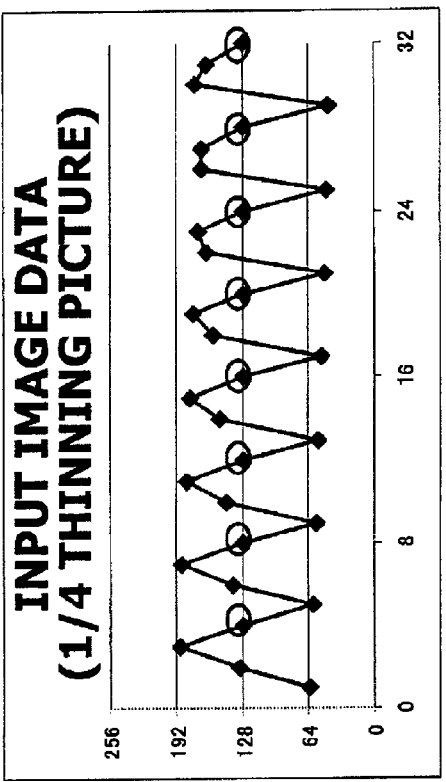
FIG.12A'
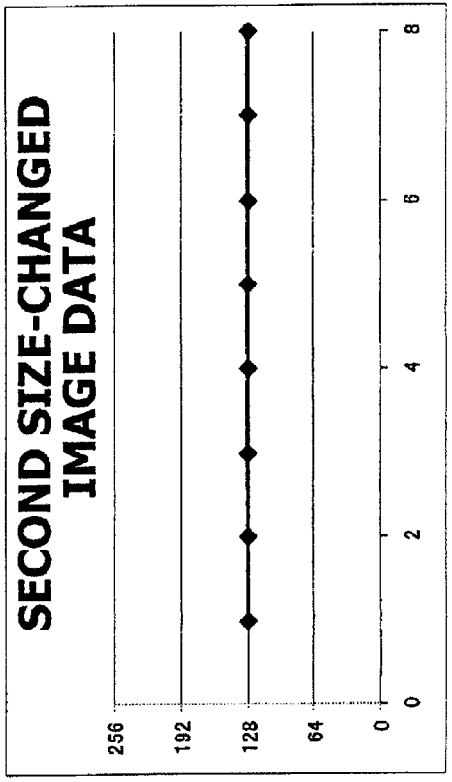
FIG.12C2

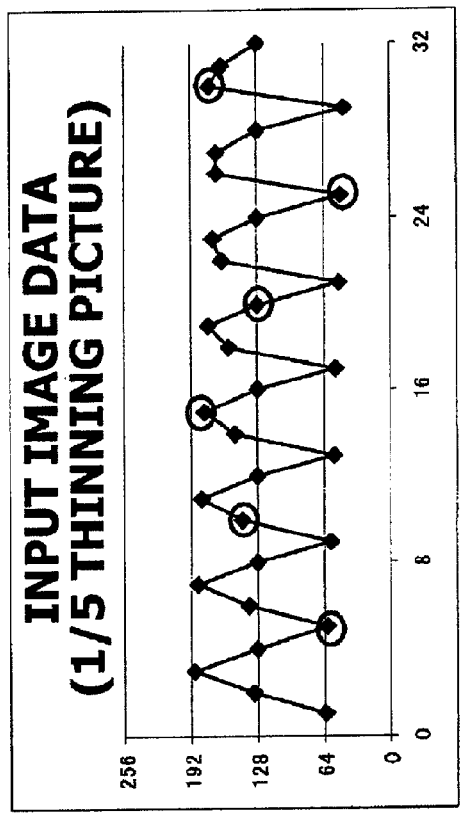
FIG.13A'
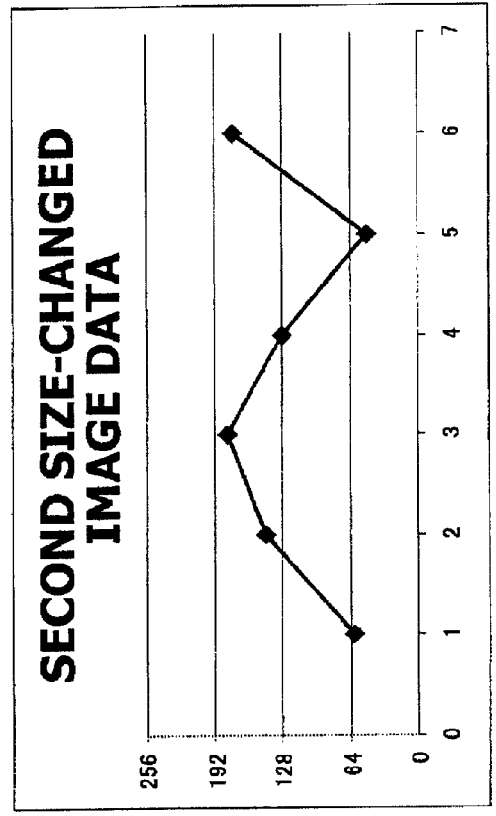
FIG.13C2

FOCUS EVALUATION VALUE GENERATION APPARATUS, FOCUS EVALUATION VALUE GENERATION METHOD, AND COMPUTER-READABLE MEDIUM STORING FOCUS EVALUATION VALUE GENERATION PROGRAM

CROSS-REFERENCE TO RELATED APPLICATION

This application is based upon and claims the benefit of priority of the prior Japanese Patent Application No. 2012-221559, filed on Oct. 3, 2012, the entire contents of which are incorporated herein by reference.

FIELD

The embodiment discussed herein is related to a focus evaluation value generation apparatus, a focus evaluation value generation method, and computer-readable medium storing a focus evaluation value generation program.

BACKGROUND

In a related art, as a method of auto focus in an imaging apparatus such as a digital single-lens reflex camera, a contrast detection scheme is commonly used widely. In the contrast detection scheme, on the basis of an image signal that is captured by an imaging element, a contrast value of an image signal in an area that is specified by an auto focus window (specification range) is extracted as a focus evaluation value. In addition, a lens position at which a contrast value that is the focus evaluation value becomes large is detected as a focus position.

In addition, as another scheme of auto focus, there is a high frequency component detection scheme. In the high frequency component detection scheme, a high frequency component of the image signal in the specification range is extracted as the focus evaluation value, and a lens position at which a value of the high frequency component becomes large is detected as the focus position. The performance of the auto focus in high frequency component detection scheme is higher than the performance of the auto focus in the contrast detection scheme.

The method of the focus is discussed, for example, in Japanese Unexamined Patent Application Publication No. H3-001668, and Japanese Examined Patent Publication No. H7-118785.

SUMMARY

However, in the high frequency component detection scheme, a load of processing increases undesirably when a calculation amount increases. For example, in the high frequency component scheme, a strength value of a frequency component is extracted on the basis of a difference value of adjacent pixels in the horizontal direction or the vertical direction. Therefore, in the high frequency component scheme, it is desirable that a difference value of adjacent pixels is calculated for all pixels in the specification range, and the calculation amount increases undesirably. Therefore, the high frequency component detection scheme has not been employed.

According to a first aspect of the embodiment, there is provided a focus evaluation value generation apparatus that generates a focus evaluation value that indicates a focusing degree of an optical system of a digital imaging apparatus and includes a low frequency image data generation unit configured to generate low frequency image data that is obtained by extracting a low frequency component from input image data that is obtained by imaging a subject, a thinned image generation unit configured to generate thinned input image data and thinned low frequency image data by respectively thinning out the input image data and the low frequency image data at an identical rate, and a focus evaluation value generation unit configured to generate a focus evaluation value on the basis of a difference value between a pixel of the thinned input image data and a pixel of the thinned low frequency image data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 3A, 3B, and 3C1 are diagrams illustrating frequency bands of image data in the regular processing.

FIGS. 4A, 4C2, and 4D are diagrams illustrating frequency bands of image data in the focus evaluation value generation processing according to the embodiment.

FIGS. 5A, 5B, and 5C1 are diagrams illustrating examples of a specific frequency of a luminance signal of image data in the regular processing.

FIGS. 6A, 6C2, and 6D are diagrams illustrating examples of a specific frequency of a luminance signal of image data in the focus evaluation value generation processing according to the embodiment.

FIG. 8B' is a diagram illustrating example of pixel values of a thinning picture of the low frequency extraction data 123. FIG. 8C1 is a diagram illustrating example of pixel values of the first size-changed image data 124 after the thinning processing.

FIG. 9A' is a diagram illustrating example of pixel values of a thinning picture of the input image data Da. FIG. 9C2 is a diagram illustrating example of pixel values of the second size-changed image data 125 after the thinning processing.

FIG. 10 is a diagram illustrating display an example Dp of a focus evaluation value that is displayed on the display unit.

FIG. 11 is a diagram illustrating an example of a flow of each piece of processing in the focus evaluation value generation apparatus according to the embodiment.

FIG. 12A' is a diagram illustrating example of a thinning picture at the thinning rate 1/4 of the input image data Da that is represented by the equation 1. FIG. 12C2 is a diagram illustrating example of the second size-changed image data 125 after the thinning.

FIG. 13A' is a diagram illustrating example of a thinning picture at a thinning rate 1/5 of the input image data Da that is represented by the equation 1. FIG. 13C2 is a diagram illustrating example of the second size-changed image data 125 after the thinning processing.

DESCRIPTION OF EMBODIMENTS

The embodiments of the present invention are described below in accordance with the accompanying drawings. However, the technical range of the present invention is not limited to such embodiments, and includes matters described in the claims and equivalents thereof.

[Configuration of an Imaging System on which a Focus Evaluation Value Generation Apparatus is Mounted]

Figure 1:
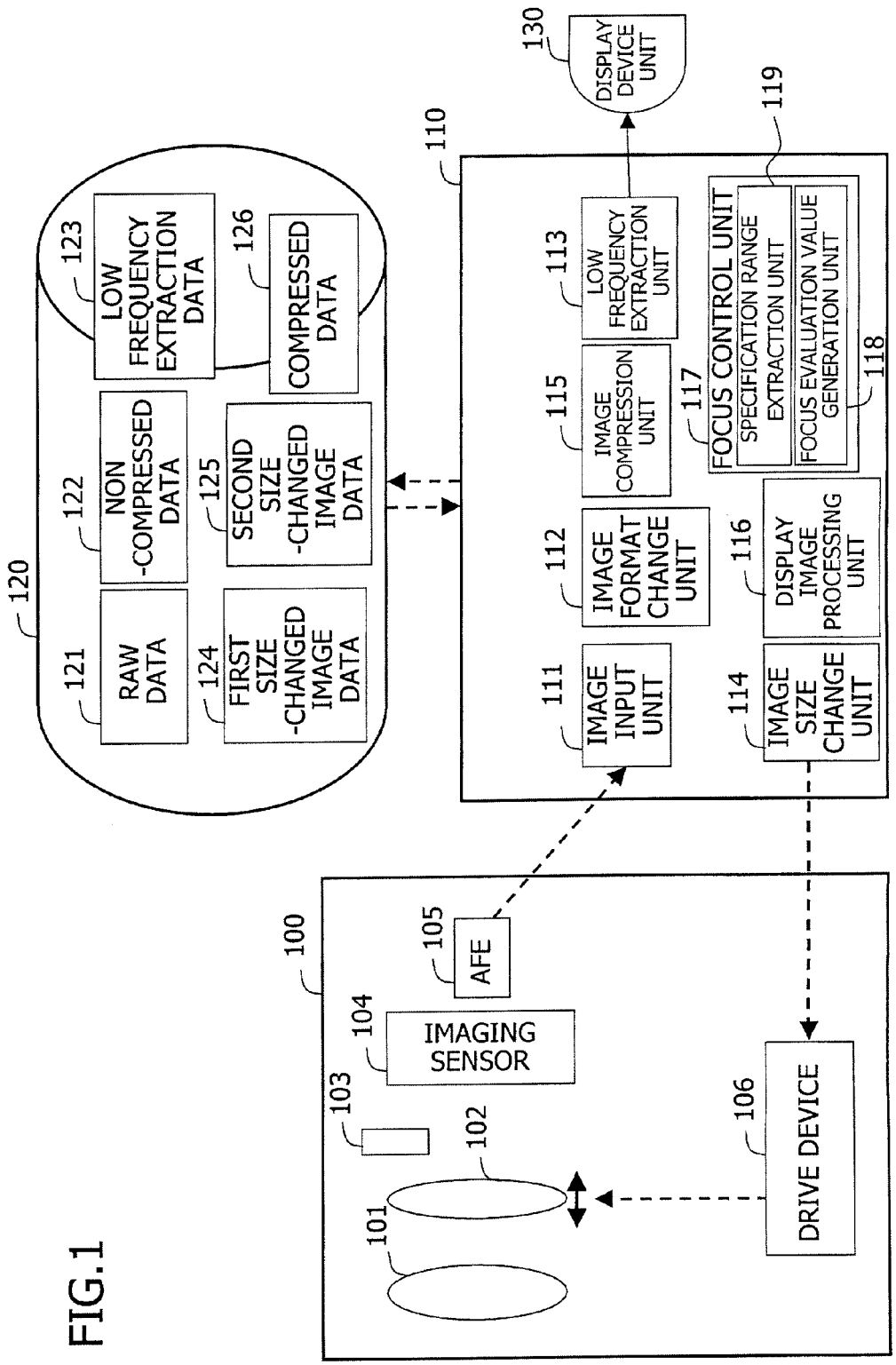
FIG. 1 is a diagram illustrating an example of a configuration of an imaging system on which a focus evaluation value generation apparatus according to an embodiment is mounted.

FIG. 1 is a diagram illustrating an example of a configuration of an imaging system on which a focus evaluation value generation apparatus according to an embodiment is mounted. The imaging system is, for example, a digital single-lens reflex camera. In FIG. 1, the focus evaluation value generation apparatus is, for example, a focus evaluation value generation unit 118.

The imaging system in FIG. 1 includes, for example, an imaging unit 100, an image conversion unit 110, an image storage unit 120, and a display device unit 130. The imaging unit 100 focuses a lens, images a subject, and captures or displays the obtained image. The imaging unit 100 includes, for example, a zoom lens 101, a focus lens 102, an IRIS 103, an imaging sensor 104, an AFE 105, and a drive device 106. Light source-reflected light from the subject is formed as an image on the imaging sensor 104 through the two lenses 101 and 102, and the IRIS 103 that performs light amount adjustment, and is subject to photoelectric conversion and digital data processing by the AFE 105.

The image data that is digitalized by the AFE 105 is converted into RAW data 121, non-compressed data 122, low frequency extraction data 123, first size-changed image data 124, second size-changed image data 125, and compressed data 126 by the image conversion unit 110, and stored in the image storage unit 120.

The image conversion unit 110 includes, for example, an image input unit 111, an image format change unit 112, a low frequency extraction unit 113, an image size change unit 114, an image compression unit 115, a display image processing unit 116, and a focus control unit 117.

The image input unit 111 performs RAW format conversion on the input digital data and stores it to the image storage unit 120. The image format change unit 112 generates the non-compressed data 122 on the basis of the RAW data 121, and the low frequency extraction unit 113 generates the low frequency extraction data 123 on the basis of the non-compressed data 122. The image size change unit 114 generates the first size-changed image data 124 on the basis of the low frequency extraction data 123, and generates the second size-changed image data 125 on the basis of the non-compressed data 122.

In addition, the image compression unit 115 generates the compressed data 126 on the basis of the first size-changed image data 124. The display image processing unit 116 converts the first size-changed image data 124 into image data that is compatible with the display device unit 130, and outputs the image data to the display device unit 130.

In addition, the focus control unit 117 controls a focus state so as to shift a physical position of the focus lens 102 to the zoom lens 101 side or the imaging sensor 104 side using the drive device 106. The focus control unit 117 includes, for example, a specification range extraction unit 119 and a focus evaluation value generation unit 118. The focus control unit 117 obtains a focus evaluation value that indicates an evaluation value of a focus state each time the focus lens 102 is shifted. In addition, a position at which the focus evaluation value becomes the highest is searched for as a state in which the focus lens 102 comes into focus (focus state), for example, in accordance with hill climbing. As a working memory of the search processing, the image storage unit 120 is used.

In the range specification method by the specification range extraction unit 119, for example, there are a manual scheme and an auto scheme. In the manual scheme, a focus frame that is used to specify a range on an image by a circle or a square is displayed as an on-screen display (OSD) on the display device. In addition, a position of the focus frame is changed by a cursor key operation that indicates the vertical and horizontal directions by a user, and the size of the focus frame is changed by another key operation. In the auto scheme, a focus frame of a screen is displayed on the display device as the OSD so that a target of focus is clarified. The user sets the focus frame for one location or two locations at the center, or sets the focus frame for nine locations in a multi-focus mode, on the basis of a menu. In the multi-focus mode of the auto scheme, the focusing is performed for example, on the most adjacent target.

In addition, the specification range extraction unit 119 extracts data in the specification range of the target image data by any of a read-out range of the imaging sensor 104, a read-out range of the AFE 105, a capture range of the image input unit 111, a reference range of the RAW data 121, and a reference range of non-compressed data. In addition, the focus evaluation value generation unit 118 calculates a focus evaluation value that is an evaluation value of the focus state on the basis of the first size-changed image data 124 and the second size-changed image data 125. The processing of the focus evaluation value generation unit 118 is described below in detail.

[Flow of the Processing of the Focus Evaluation Value Generation Unit 118]

Figure 2:
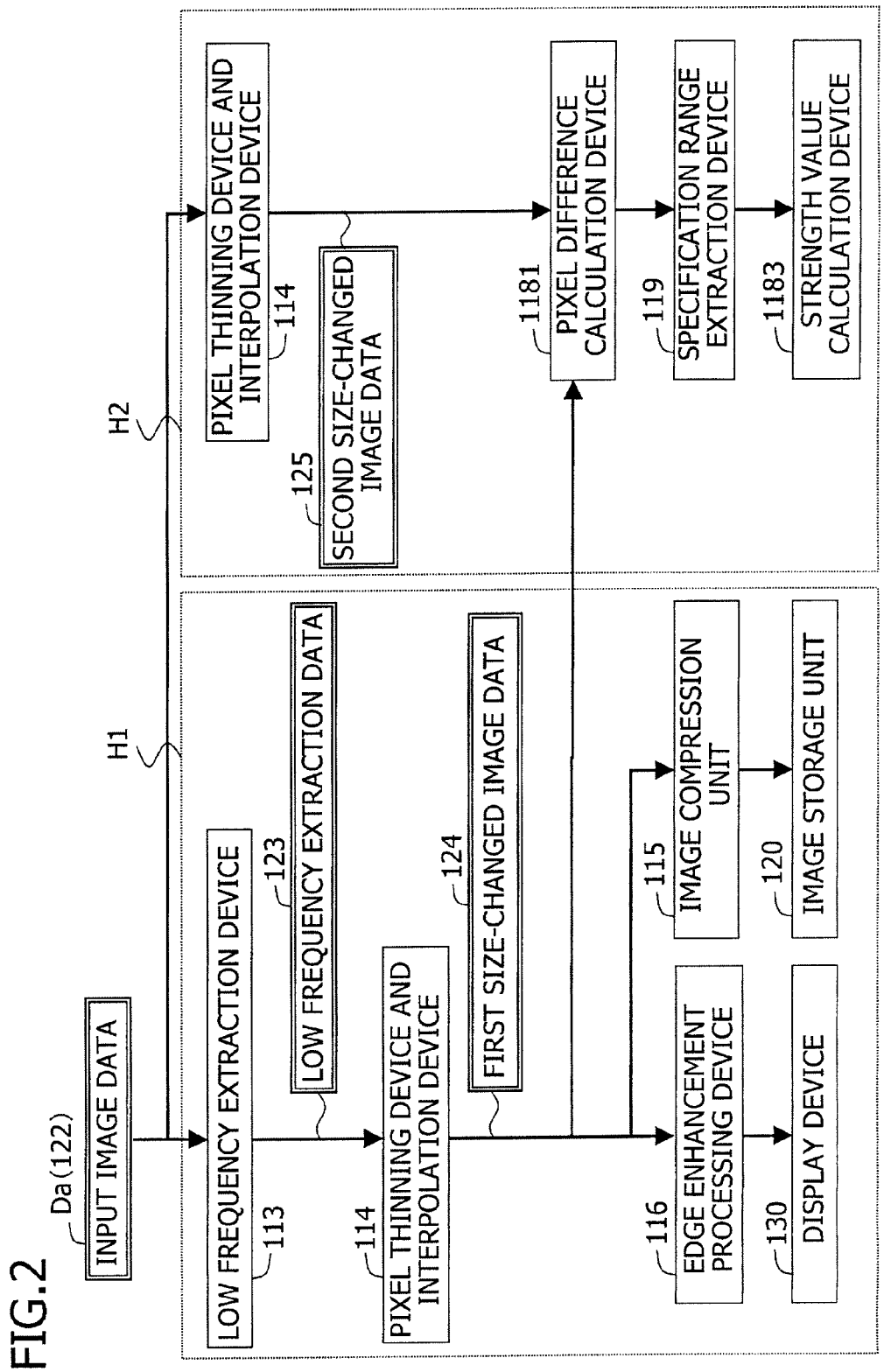
FIG. 2 is a diagram illustrating a flow of the processing of the focus evaluation value generation unit 118 according to the embodiment. explaining frequency band of the image data to affect normal processing

FIG. 2 is a diagram illustrating a flow of the processing of the focus evaluation value generation unit 118 according to the embodiment. Processing H1 in FIG. 2 is processing that is usually executed, and processing H2 is processing of the focus evaluation value generation unit 118 according to the embodiment. In addition, in FIG. 2, a low frequency extraction device corresponds to the low frequency extraction unit 113, and a pixel thinning device and an interpolation device corresponds to the image size change unit 114. In addition, input image data corresponds to the non-compressed data 122.

[Flow of the Regular Processing H1]

First, the processing H1 that is usually executed is described. The low frequency extraction device 113 applies a low-pass filter (LPF) to input image data Da in order to remove noise, and generates the low frequency extraction data 123. The low-pass filter is a filter that cuts off a high frequency component in the target image data and outputs a low frequency component. Generally, the low-pass filter is applied in order to remove noise such as moire of the image in the input image data Da.

After that, the pixel thinning device and the interpolation device 114 generate the first size-changed image data 124 by thinning out pixel information of the low frequency extraction data 123. The first size-changed image data 124 corresponds to, for example, image data in a generation process of the compressed data 126 that is stored in the image storage unit 120 or image data of a generation process of image data that is output to the display device unit 130. Generally, the data size of the input image data Da that is obtained by the imaging unit 100 is larger than the data size of the compressed data 126 that is stored in the image storage unit 120 and the data size of the image data that is output to the display device unit 130. Therefore, the pixel thinning device and the interpolation device 114 generates the first size-changed image data 124 by thinning out the pixel information of the low frequency extraction data 123 in the vertical or horizontal directions. By thinning out the pixel information at a certain thinning rate, the first size-changed image data 124 having a desired data size is generated.

For example, the number of effective pixels of the imaging element of the digital single-lens reflex camera as illustrated in FIG. 1 corresponds to "4000 pixels×3000 pixels". On the other hand, the input image data Da is converted, for example, into the compressed data 126 having the data size of "640 pixels×480 pixels" (VGA size), and stored in the image storage unit 120. The data size of the compressed data 126 is set, for example, by the user. In addition, the data size of the image data that is output to the display device unit 130 corresponds to, for example, "320 pixels×240 pixels", and is further smaller than the VGA size. The display device unit 130 is, for example, an electronic view finder, a liquid crystal screen.

[Thinning Rate of Pixel Information]

The thinning rate in the embodiment is, for example, 1/4, 1/10. For example, when the thinning rate of pixel information is 1/4, information of one pixel out of four pixels in the low frequency extraction data 123 is extracted as information of a pixel of the first size-changed image data 124. It is noted that it is probable that the thinning rate is not a unit fraction in which a denominator is an integer (fraction in which a molecule is 1) such as 1/4 or 1/10. The thinning rate may be, for example, a unit fraction in which a denominator is a decimal fraction such as 1/4.2 or 1/10.1. As described above, when the thinning rate is the unit fraction in which a denominator is a decimal fraction, the pixel thinning device and the interpolation device 114 calculates pixel information after the thinning processing out, by linear interpolation processing or adjacent pixel selection processing based on information of an adjacent pixel.

[Sampling Theorem]

By thinning pixel information of image data, a bandwidth of a frequency that is sampled from the image data after the thinning processing is narrowed. This phenomenon is known as the sampling theorem. In accordance with the sampling theorem, in order to sample a certain frequency, it is desirable that the sampling is performed by a frequency that is more than two times higher than a bandwidth of the frequency component. However, with the reduction in the pixel information by the thinning processing, it is difficult to perform the sampling by the frequency that is more than two times higher than the bandwidth of the frequency component. As a result, the frequency bandwidth of the image data after the thinning processing is narrowed.

For example, when the thinning rate is 1/M, sample points of the image data are reduced to 1/M by the thinning processing. As a result, the frequency bandwidth to be sampled in the image data after the thinning processing is reduced to 1/M of the frequency bandwidth in the image data before the thinning processing. In addition, a frequency that exceeds 1/M in the image data before the thinning processing is sampled as a frequency of a frequency band that is less than or equal to 1/M, which is folded back using the frequency of 1/M (hereinafter referred to as folding frequency) as a base point. That is, a signal component of the frequency that exceeds the folding frequency the image data before the thinning processing is folded back on an original signal component in the frequency band that is less than or equal to the folding frequency, as a signal component of an alias frequency.

As described above, by executing the thinning processing, a frequency band that is sampled from image data is reduced, and a frequency that exceeds a folding frequency is sampled as a frequency that is less than or equal to the folding frequency. The folding of a frequency by the thinning processing is described later with reference with a drawing that illustrates a specific example.

Returning to FIG. 2, edge enhancement processing is executed on the first size-changed image data 124 that is output to the display device unit 130 by an edge enhancement processing device of the display image processing unit 116, as appropriate. As a result, display image data is generated and output to the display device unit 130. In addition, compression processing is executed on the first size-changed image data 124 that is a compression target, and the compressed data 126 is generated. The generated compressed data 126 is stored in the image storage unit 120.

[Frequency Band of Image Data]

FIGS. 3A to 3C1 are diagrams illustrating frequency bands of image data in the regular processing H1 in FIG. 2. The horizontal axis indicates a frequency band. FIG. 3A illustrates a frequency band that is sampled in the input image data Da. On the other hand, FIG. 3B illustrates a frequency band in the low frequency extraction data 123. By applying the low-pass filter to the low frequency extraction data 123, only a low frequency component is extracted. Therefore, a high frequency band in the frequency band of FIG. 3B is cut off. It is noted that FIG. 3B illustrates the frequency band of the low frequency extraction data 123 in which the high frequency component that exceeds a cut-off frequency by the low-pass filter is completely cut off.

In addition, FIG. 3C1 illustrates a frequency band of the first size-changed image data 124 that is generated by executing the thinning processing of pixel information on the low frequency extraction data 123. In FIG. 3C1, the thinning rate is, for example, 1/4. That is, the first size-changed image data 124 includes one piece of pixel information, out of four pieces of pixel information in the low frequency extraction data 123.

As describe above, by executing the thinning processing of 1/4, a frequency band that can be sampled in the low frequency extraction data 123 is reduced to 1/4. As a result, a frequency component of a frequency band that exceeds 1/4 is folded back on a frequency component of a frequency band that is less than or equal to 1/4. However, in the low frequency extraction data 123, a frequency of a frequency band that exceeds a cut-off frequency (for example, a frequency of 1/4) is cut off beforehand by the low-pass filter. Therefore, in the example of FIG. 3C1, the folding of a frequency by the thinning processing does not occur.

After that, returning to FIG. 2, the processing H2 of the focus evaluation value generation unit 118 according to the embodiment is described.

[Flow of the Processing H2 of the Focus Evaluation Value Generation Unit 118]

In addition, the pixel thinning device and the interpolation device 114 according to the embodiment generate the second size-changed image data 125 by thinning out the input image data Da. At that time, the thinning rate is the same as the thinning rate at the time of generation of the first size-changed image data 124. The pixel thinning device and the interpolation device 114 generate the second size-changed image data 125 by thinning information of pixels of the input image data Da in the vertical or horizontal directions.

In addition, a pixel difference calculation device 1181 of the focus evaluation value generation unit 118 calculates a difference value of information between corresponding pixels in a focus range that is extracted by a specification range extraction device 119 of the focus evaluation value generation unit 118, for the first size-changed image data 124 and the second size-changed image data 125. After that, a strength value calculation device 1183 of the focus evaluation value generation unit 118 generates a strength value of a high frequency based on the calculated difference value as a focus evaluation value. For example, the strength value calculation device 1183 generates one of a maximum value of an absolute value of a difference value between pixels, a sum value of the absolute values, an area average value of the absolute values, a square sum of the difference values between pixels, an area average value of the square sums of the absolute values, as the focus evaluation value.

As described above, by executing the thinning processing, the frequency component of the frequency band that exceeds the folding frequency in the image data before the thinning processing is folded back on the original signal component of the frequency band that is less than or equal to the folding frequency. Differently from the low frequency extraction data 123, the low-pass filter is not applied to the input image data Da, so that a large amount of folding occurs due to the thinning processing. Therefore, in the frequency of the second size-changed image data 125, a large amount of alias frequencies are included.

Thus, a difference value between the first size-changed image data 124 and the second size-changed image data 125 indicates a signal component of an alias frequency that indicates a high frequency component. Therefore, information based on the difference value is generated as a focus evaluation value that indicates a strength value of the high frequency component.

As described above, the focus evaluation value generation apparatus according to the embodiment generates the second size-changed image data on which the thinning processing is executed but low frequency processing extraction processing for noise reduction is not executed. In addition, the focus evaluation value generation apparatus generates the focus evaluation value that indicates the strength of the high frequency component on the basis of the difference value between the first size-changed image data and the second size-changed image data that are generated in the compression process of image data or the display process of image data that is regular processing. In the first size-changed image data 124 and the second size-changed image data 125, the pieces of information of pixels are thinned, so that a calculation amount for calculating the difference value is suppressed. Therefore, the focus evaluation value generation apparatus according to the embodiment allows a high frequency component of the image data to be extracted while a calculation amount is suppressed.

[Frequency Band of Image Data]

FIGS. 4A to 4D are diagrams illustrating frequency bands of image data in the focus evaluation value generation processing H2 according to the embodiment in FIG. 2. Similar to FIG. 3, the horizontal axis indicates a frequency band. In addition, FIG. 4A is the same as FIG. 3A and illustrates a frequency band that is sampled in the input image data Da.

On the other hand, FIG. 4C2 illustrates a frequency band of the second size-changed image data 125 that is generated by executing the thinning processing of pixels for the input image data Da. In such an example, the thinning rate is the same 1/4 as the first size-changed image data 124. By the thinning processing, in the input image data Da, a frequency band that can be sampled is limited to 1/4, and a frequency component of a frequency band that exceeds 1/4 (folding frequency) is folded back on a frequency component of a frequency band that is less than or equal to 1/4. Therefore, in FIG. 4C2, a component Ex of the frequency that exceeds the folding frequency is folded back on a band that is less than or equal to the folding frequency in triplicate.

Specifically, at that time, the frequency that exceeds the folding frequency appears, for example, on a symmetrical position using the folding frequency as a base point as an alias frequency. For example, a frequency h2 that corresponds to 3/8 portion of the sampling frequency of FIG. 4A appears as an alias frequency h1 that corresponds to 1/8 portion of the sampling frequency, by the folding. Therefore, in FIG. 4C2, a signal component of the frequency h2 is sampled as a signal component of the frequency h1.

In addition, for example, by the thinning processing at an identical rate, a frequency h3 that corresponds to 5/8 in the input image data Da appears as the alias frequency h1 that corresponds to 1/8 in the input image data Da. When the thinning processing is executed in accordance with the thinning rate 1/4, the alias frequency is folded back in triplicate. As described above, when the alias frequency is folded back in multiple, a plurality of different frequencies may be sampled as an identical frequency.

In addition, FIG. 4D illustrates a frequency band that corresponds to a difference value between the pixel information of the first size-changed image data 124 (FIG. 3C1) and the pixel information of the second size-changed image data 125 (FIG. 4C2). The first size-changed image data 124 and the second size-changed image data 125 have the same data size because the thinning processing is executed in accordance with the identical thinning rate. As illustrated in FIG. 4D, the difference value between the first size-changed image data 124 and the second size-changed image data 125 indicates the alias frequency component Ex, that is, the high frequency component of the input image data Da.

The processing of the focus evaluation value generation unit 118 according to the embodiment is described below with reference to a specific frequency of image data.

[Specific Example (Frequency) of Image Data: The Regular Processing H1]

FIGS. 5A to 5C1 are diagrams illustrating examples of a specific frequency of a luminance signal of image data in the regular processing H1. The horizontal axis indicates a frequency of a luminance signal, and the vertical axis indicates amplitude. In such an example, the luminance signal is, for example, an R value of an RGB scheme, a Y value of a YCbCr scheme.

FIG. 5A indicates an example of a frequency of a luminance signal of the input image data Da. In such an example, a frequency band of the input image data Da ranges 0 Hz to 1024 Hz. On the other hand, FIG. 5B illustrates an example of a frequency of a luminance signal of the low frequency extraction data 123 that is generated by applying the low-pass filter to the input image data Da. In such an example, the low-pass filter is, for example, a filter that reduces a frequency component that exceeds 128 Hz. Therefore, in FIG. 5B, the frequency component that exceeds 128 Hz is reduced significantly. It is noted that the frequency component that exceeds 128 Hz in FIG. 5B can be removed highly accurately by improving the performance of the low-pass filter.

In addition, FIG. 5C1 illustrates a frequency of a luminance signal the first size-changed image data 124 that is generated by executing the thinning processing on the low frequency extraction data 123 at the thinning rate 1/8. By the thinning processing, a frequency that can be sampled is limited from "0 Hz to 1024 Hz" to "0 Hz to 128 Hz (=1024÷8), that is, limited to 1/8. Therefore, in FIG. 5C1, the frequency that exceeds the 128 Hz (folding frequency) is folded back on the frequency band of "0 Hz to 128 Hz".

However, as illustrated in FIG. 5B, in the low frequency extraction data 123, a signal component of the frequency that exceeds 128 Hz is greatly reduced by reducing a high frequency component by the low-pass filter beforehand. Therefore, in FIG. 5C1, an alias frequency component that is folded back on the frequency band of "0 Hz to 128 Hz" is suppressed.

[Specific Example (Frequency) of Image Data: The Focus Evaluation Value Generation Processing H2]

FIG. 6 are diagrams illustrating examples of a specific frequency of a luminance signal of image data in the focus evaluation value generation processing H2 according to the embodiment. The horizontal axis indicates a frequency of a luminance signal, and the vertical axis indicates amplitude. FIG. 6A is the same as FIG. 5A and illustrates an example of a frequency of a luminance signal of the input image data Da.

In addition, FIG. 6C2 illustrates a frequency of a luminance signal of the second size-changed image data 125 that is generated by executing the thinning processing on the input image data Da in accordance with the thinning rate 1/8. Similar to FIG. 5C1, by the thinning processing, a frequency that can be sampled is limited to "0 Hz to 128 Hz", and the frequency that exceeds 128 Hz is folded back on the frequency band of "0 Hz to 128 Hz". The second size-changed image data 125 includes a high frequency component, and in FIG. 6C2, there are a lot of alias frequency components that are folded back on the frequency band of "0 Hz to 128 Hz".

In addition, FIG. 6D illustrates a frequency based on difference information of luminance signals of the first size-changed image data 124 and the second size-changed image data 125. The amplitude of a frequency component illustrated in FIG. 6D indicates amplitude of the alias frequency in the second size-changed image data 125 (Ex in FIG. 4), that is, a strength value of the high frequency component that is included in the input image data Da. As described above, the difference information between the luminance signals of the first size-changed image data 124 and the second size-changed image data 125 indicates the strength value of the high frequency component that is included in the input image data Da.

The processing of the focus evaluation value generation unit 118 according to the embodiment is described below with reference to a specific pixel value of image data.

[Specific Example (Pixel Value) of Image Data: The Regular Processing H1]

Figure 7A:
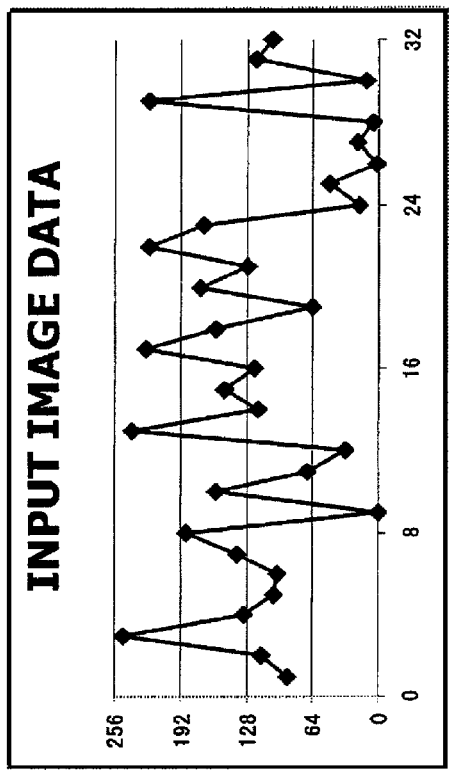
FIG. 7A is a diagram illustrating example of pixel values of the input image data.
Figure 7B:
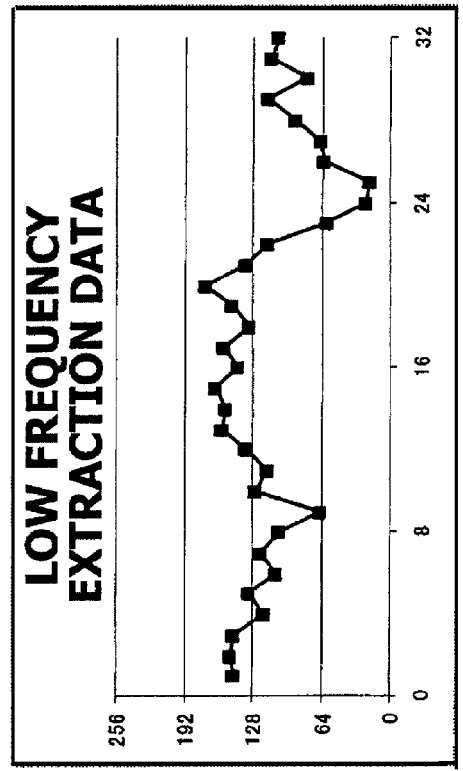
FIG. 7B is a diagram illustrating example of pixel values of the low frequency extraction data.

FIGS. 7A and 7B are diagrams respectively illustrating examples of pixel values of the input image data Da and pixel values of the low frequency extraction data 123. The horizontal axis indicates each pixel when two-dimensional image data is scanned, and the vertical axis indicates a pixel value that corresponds to the pixel. The total number of pixels of the image data in the examples of FIGS. 7A and 7B is 32, and a pixel value that indicates a luminance signal corresponds to a value of 0 to 255.

FIG. 7A illustrates transition of pixel values that correspond to pixels 1 to 32 of the horizontal axis in the input image data Da. When a degree of the transition of the pixel values of the horizontal axis is large, a difference value between luminance signals of adjacent pixels is large, and the input image data Da includes a high frequency component. On the other hand, when the degree of the transition of the pixel values is small, the input image data Da includes a low frequency component. In addition, FIG. 7B illustrates transition of pixel values of low frequency extraction data. By employing the low-pass filter, pixel values are smoothed, and a degree of transition of the pixel values is reduced. Therefore, the degree of transition of the pixel values in FIG. 7B is small as compared with FIG. 7A.

FIGS. 8B' and 8C1 are diagrams respectively illustrating examples of pixel values of a thinning picture of the low frequency extraction data 123 and pixel values of the first size-changed image data 124 after the thinning processing. In such an example, the thinning rate is 1/4. Therefore, in FIG. 8B', values that correspond to the pixel 4, the pixel 8, the pixel 16, . . . of the horizontal axis in the low frequency extraction data 123 are marked. In addition, in FIG. 8C1, the marked eight pixel values are extracted. As illustrated in FIG. 8C1, by the thinning processing, the degree of the transition of the pixel values is further reduced.

[Specific Example (Pixel Value) of Image Data: The Focus Evaluation Value Generation Processing H2]

FIGS. 9A' and 9C2 are diagrams respectively illustrating examples of pixel values of a thinning picture of the input image data Da and pixel values of the second size-changed image data 125 after the thinning processing. In such an example, the thinning rate is the same rate 1/4 as the first size-changed image data 124 illustrated in FIG. 8. Therefore, in FIG. 9A', values that correspond to the pixel 4, the pixel 8, the pixel 16, . . . of the horizontal axis in the input image data Da are marked. In addition, in FIG. 9C2, the marked eight pixel values are extracted. In FIG. 9C2, by the thinning processing, a degree of transition of the pixel values is reduced, however a high degree of transition of the pixel values is maintained. Therefore, by calculating a difference value between the first size-changed image data 124 and the second size-changed image data 125, the high frequency component that is included in the original image data Da is extracted.

As described above, the focus evaluation value generation apparatus according to the embodiment generates low frequency image data that is obtained by extracting a low frequency component from input image data that is obtained by imaging a subject (low frequency extraction data), thins out the input image data and the low frequency image data at an identical rate, and generates thinned input image data (second size-changed image data) and thinned low frequency image data (first size-changed image data). In addition, the focus evaluation value generation apparatus generates a focus evaluation value on the basis of a difference value between pixels of the thinned input image data and the thinned low frequency image data. In addition, the focus evaluation value is one of a maximum value of an absolute value of a difference value between pixels, a sum value of the absolute values, an average value of the absolute values, a sum value of square values of the difference values, and an average value of the square values.

As a result, the focus evaluation value generation apparatus can simply generate a focus evaluation value that indicates a strength of a high frequency component on the basis of the difference value between the first size-changed image data and the second size-changed image data that are generally generated in the compression process of image data or the display process of image data. In the focus evaluation value generation apparatus according to the embodiment, a calculation equation of high load and calculation of adjacent pixels are not needed to be performed, and the focus evaluation value generation apparatus generates the focus evaluation value on the basis of the difference value between the pixel of the first size-changed image data 124 and the pixel of the second size-changed image data 125 after the thinning processing. Therefore, the focus evaluation value generation apparatus can minimize a calculation amount and extract the high frequency component at high speed without increasing a load.

In addition, the digital imaging apparatus includes a display unit of display image data, and in the focus evaluation value generation apparatus according to the embodiment, at least one piece of thinned low frequency image data is image data in the conversion process from the input data into the display image data to be output to the display unit or image data in the conversion process from the input data into compression image data to be stored in a storage unit that is allowed to be accessed by the digital imaging apparatus.

As described above, generally, the focus evaluation value generation apparatus can suppress the calculation amount and generate a focus evaluation value further effectively using the first size-changed image data that is generated in the compression process of image data or the display process of image data.

In addition, in the focus evaluation value generation apparatus according to the embodiment, the focus evaluation value may be displayed on the display unit. As a result, for example, when focusing is performed by a manual operation, a user can detect a lens position at which the focus evaluation value to be displayed on a display screen becomes maximum as a focus state. The display unit is, for example, an electronic view finder, a liquid crystal screen, of the digital single-lens reflex camera.

FIG. 10 is a diagram illustrating display an example Dp of a focus evaluation value that is displayed on the display unit. In the display example Dp in FIG. 10, the focus evaluation value is indicated, for example, by a straight line "br" in the horizontal direction. In addition, the arrow Tx in FIG. 10 indicates a flow of a time when the user moves the lens position in a certain direction. In the example of FIG. 10, along the flow of the arrow Tx, in the first half, the focus evaluation value increases gradually. In addition, at timing Ty, the focus evaluation value is peaked and decreases gradually. Therefore, the user can detect the lens position at the timing Ty in accordance with hill climbing as a lens position in the focus state.

As described above, the generated focus evaluation value is displayed on the display screen by the focus evaluation value generation apparatus according to the embodiment. As a result, the user can detect an optimal lens position by referring to the focus evaluation value that indicates a strength value of a high frequency component even when the focusing is performed by the manual operation.

It is noted that the focus evaluation value generation apparatus according to the embodiment utilizes a thinned image generation unit that generates thinned image data and a low frequency image data generation unit that are provided beforehand. Therefore, the focus evaluation value generation apparatus does not need to newly provide a thinned image generation unit, and the like, so that a focus evaluation value can be generated easily. In addition, the focus evaluation value generation apparatus according to the embodiment generates the second size-changed image data 125 first while low frequency extraction data is generated. As a result, the generation processing of a focus evaluation value is executed effectively.

FIG. 11 is a diagram illustrating an example of a flow of each piece of processing in the focus evaluation value generation apparatus according to the embodiment. As illustrated in FIG. 11, the pixel thinning device and the interpolation device 114 (thinned image generation unit) generates the second size-changed image data 125 in the focus evaluation value generation processing H2 first while low frequency extraction processing 113 in the regular processing H1 is executed. In addition, the pixel thinning device and the interpolation device 114 generates the first size-changed image data 124 in the regular processing H1 after generating the second size-changed image data 125. As a result, the focus evaluation value generation apparatus can generates a focus evaluation value at high speed while utilizing an existing thinned image generation unit effectively.

It is noted that, in the embodiment, a case is described in which the thinning rate is 1/4, 1/8, and the like, however the embodiments are not limited to such an example. It is noted that the focus evaluation value generation apparatus according to the embodiment can further improve extraction accuracy of a high frequency component that is generated as a focus evaluation value when the thinning rate is set at 1/2 or more. The case in which the thinning rate is 1/2 or more indicates, for example, a case in which the thinning rate is 1/2, 2/3, 3/4.

As illustrated in FIG. 4, in the sampling theorem, folding of a frequency occurs by the thinning processing, and a signal component of an alias frequency is folded back on an original signal component that is less than or equal to the folding frequency. When the folding of a frequency occurs as described above, the signal components may be cancelled each other and disappear depending on a direction of a phase of the folded signal component and the number of integrated elements. That is, the signal components of the alias frequency that exceeds the folding frequency may be cancelled each other and disappear. As a result, accuracy of a difference value between the first size-changed image data 124 and the second size-changed image data 125 is reduced.

Therefore, in order to avoid the cancellation of components of the alias frequency, the focus evaluation value generation apparatus suppresses the number of times of folding of a frequency by the thinning processing to one time by setting the thinning rate at 1/2 or more. As a result, the cancellation of components of the alias frequency is avoided, and the accuracy of the different value between the first size-changed image data 124 and the second size-changed image data 125 is improved. As a result, accuracy of a focus evaluation value is improved.

Second Embodiment

In the first embodiment, the case is described in which the first size-changed image data and the second size-changed image data are generated on the basis of one thinning rate, and one focus evaluation value is generated. On the other hand, in a second embodiment, a case is described in which first size-changed image data and second size-changed image data of a plurality of patterns are generated on the basis of a plurality of thinning rates, and a plurality of focus evaluation values are generated. The focus evaluation value generation apparatus can determine a strength value of a high frequency component that is extracted further highly accurately as a focus evaluation value by generating a plurality of focus evaluation values.

[Cancellation of Frequency Components]

As described above, in the first embodiment, signal components of an alias frequency may be cancelled each other and disappear by the thinning processing. As long as the thinning rate is less than 1/2, the cancellation can occur in any thinning rate. However, a frequency in which cancellation of alias frequency components occurs is different depending on a thinning rate. This is why a frequency that is folded back as an alias frequency is different because a folding frequency is different depending on a thinning rate.

The cancellation between the alias frequency components by the thinning processing is described below with reference to an equation. An equation 1 is an equation that represents image data having two frequencies. In the equation 1, F1 (x) indicates a pixel value, and "x" indicates a pixel position. For example, when the total number of pixels of image data is 32, "x" corresponds to a value of 1, 2, ..., and 32. In addition, in the equation 1, the two frequencies are "fs/4+fd" and "fs/2−fd", "fs" is a value 1, and "fd" is a given coefficient 0.001953. It is noted that "pi" indicates n.

$$F1(x)=64*\{2-\sin(2*pi*(fs/4+fd)*x)-\sin(2*pi*(fs/2-fd)*x)\} \quad \text{[Equation 1]}$$

In the equation 1, addition of 2 and multiplication of 64 are performed. As a result, in the value F1 (x) that is calculated on the basis of the equation 1, a value of a value range −2 to 2 is converted into a value of a range 0 to 256. That is, by substitution of the value 0, 1, 2, ..., and 32 into the equation 1, image data having the frequencies "fs/4+fd" and "fs/2−fd" is generated.

The plurality of pieces of second size-changed image data 125 that are generated by thinning out the input image data Da that is represented by the equation 1 at a plurality of different thinning rates are described below.

[Thinning Rate 1/4]

FIGS. 12A' and 12C2 are diagrams illustrating examples of a thinning picture at the thinning rate 1/4 of the input image data Da that is represented by the equation 1, and the second size-changed image data 125 after the thinning. In the input image data Da in FIGS. 12A' and 12C2, the horizontal axis indicates a value of "x" in the equation 1, and the vertical axis indicates a value of F1 (x) in the equation 1. In such an example, the thinning rate is 1/4, so that, in FIG. 12A', values that correspond to the pixel 4, the pixel 8, the pixel 16, ... of the horizontal axis in the input image data Da are marked.

In addition, FIG. 12C2 illustrates pixel values after the thinning, which are marked in FIG. 12A'. In FIG. 12C2, all of the pixel values of the second size-changed image data 125 are the same. This indicates that components of two frequencies in the equation 1 are cancelled each other and disappear by the thinning processing. Such an example is described with reference to an equation 2.

$$F4(x)=64*\{2-\sin(2*pi*fd*x)+\sin(2*pi*fd*x)\}=128 \quad \text{[Equation 2]}$$

The equation 2 is a calculation equation that represents image data that is generated by thinning out the image data that is represented by the equation 1 at the thinning rate 1/4. In the equation 2, "F4 (x)" indicates a pixel value, and "x" indicates a pixel position. In the case of the thinning rate 1/4, "x" corresponds to a value of 4, 8, .... In addition, "fs" and "fd" are same as the equation 1. Both of the two frequencies "fs/4+fd" and "fs/2−fd" in the equation 1 are frequencies that exceed a frequency of 1/4, which is the folding frequency. Therefore, folding of the frequency occurs by the thinning processing, and the two frequencies are respectively sampled as "fd" and "−fd". In this case, signal components of two frequencies "fd" and "−fd" are cancelled each other, so that the value always becomes 128 (=64*2).

[Thinning Rate 1/5]

FIGS. 13A' and 13C2 are respectively diagrams illustrating examples of a thinning picture at a thinning rate 1/5 of the input image data Da that is represented by the equation 1 and the second size-changed image data 125 after the thinning processing. In the input image data Da in FIG. 13, the horizontal axis indicates a value of "x" in the equation 1, and the vertical axis indicates a value of "F1 (x)" in the equation 1. In such an example, the thinning rate is 1/5, so that, in FIG. 13A', values that correspond to the pixel 5, the pixel 10, the pixel 15, ... of the horizontal axis in the input image data Da are marked.

In addition, in FIG. 13C2, the pixel values that are marked in 13A' after the thinning processing are illustrated. Different from the case of the thinning rate 1/4, in the case of the thinning rate 1/5, the pixel values after the thinning processing are different. That is, cancellation of frequency components by the thinning processing does not occur. Such a case is described with reference to an equation 3.

$$F5(x)=64*\{2-\sin(2*pi*(fs/20+fd)*x)-\sin(2*pi*(fs/10-fd)*x)\} \quad \text{[Equation 3]}$$

The equation 3 is a calculation equation that indicates image data that is generated by thinning out the image data that is indicated by the equation 1 in accordance with the thinning rate 1/5. In the equation 3, F5 (x) indicates a pixel value, and "x" indicates a pixel position. In the case of the thinning rate 1/5, "x" corresponds to a value of 5, 10, .... In addition, "fs" and "fd" are the same as the equation 1. Both of the two frequencies of "fs/4+fd" and "fs/2−fd" in the equation 1 are frequencies that exceed a frequency of 1/5 that is a folding frequency. Therefore, folding of the frequency occurs by the thinning processing, and the two frequencies are sampled as "fs/20+fd" and "fs/10−fd", so that cancellation of the frequency components does not occur.

As described above, for example, when frequencies are "fs/4+fd" and "fs/2−fd", the cancellation occurs at the thinning rate 1/4, however the cancellation does not occur at the thinning rate 1/5. However, a thinning rate at which cancellation of frequency components occurs by the folding is different depending on a frequency. In addition, a frequency component that is included in image data is different depending on image data, so that it is difficult to detect a thinning rate at which the cancellation of frequency components hardly occurs.

Therefore, the focus evaluation value generation apparatus according to the embodiment generates a second focus evaluation value based on first size-changed image data and second size-changed image data that are thinned out at a second rate in addition to a first focus evaluation value based on first size-changed image data and second size-changed image data that are thinned out at a first rate. In addition, the focus evaluation value generation apparatus generates one of a maximum value and an average value in the first and second focus evaluation values, as a focus evaluation value.

[Flow of the Processing H2 of the Focus Evaluation Value Generation Unit 118]

A flow of the processing of the focus evaluation value generation unit 118 according to the second embodiment is described with reference to FIG. 2. The focus evaluation value generation unit 118 according to the second embodiment generates a first focus evaluation value on the basis of a first thinning rate similar to the first embodiment.

In addition, the focus evaluation value generation unit 118 generates another piece of first size-changed image data 124 by thinning out the low frequency extraction data 123 at a second thinning rate 1/N and generates another piece of second size-changed image data 125 by thinning out the input image data Da at the second thinning rate 1/N. In addition, the focus evaluation value generation unit 118 generates a second focus evaluation value on the basis of a difference value between pixels of range specification in the first size-changed image data 124 and the second size-changed image data 125 that are generated at the thinning rate 1/N.

For example, when the focus evaluation value is large, it is indicated that a high frequency component is extracted from the input image data Da highly accurately. Therefore, the focus evaluation value generation unit 118 outputs a larger value out of the first focus evaluation value and the second focus evaluation value, as a total focus evaluation value. Alternatively, the focus evaluation value generation unit 118 may output an average value of the first and second focus evaluation values as a total focus evaluation value.

It is noted that when the thinning rates are different, the data sizes of the first and second size-changed image data are different. At that time, it is indicated that the number of pixels that constitute the difference value and are the sources of the first and second focus evaluation value are different. Thus, units (scales) of the first and second focus evaluation values are unified, for example, correspondingly to a ratio of the number of pixels that constitute the difference value.

As described above, in the embodiment, the thinning rate includes a plurality of thinning rates, and the focus evaluation value generation unit generates a total focus evaluation value based on a first focus evaluation value that is based on first thinned input image data (second size-changed image data) and first thinned low frequency image data (first size-changed image data) that are thinned out at a first thinning rate, a second focus evaluation value that is based on second thinned input image data and second thinned low frequency image data that are thinned out at a second rate, as a focus evaluation value.

As a result, by generating a plurality of focus evaluation values based on a plurality of thinning rates, the focus evaluation value generation apparatus can select a highly accurate focus evaluation value. Alternatively, the focus evaluation value generation apparatus can determine an average value of the plurality of focus evaluation values as the focus evaluation value. As a result, in the case in which the thinning rate is less than 1/2, even when cancellation of signal components of an alias frequency occurs, the focus evaluation value generation apparatus can generate the highly accurate focus evaluation value.

It is noted that the first and second thinning rates may be calculated, for example, by a calculation equation "$R2=R1\times\{1\pm(1/(R1-1))\}$, $R2=R1\times\{1-(1/(R1-1))\}$". In the calculation equation, the thinning rate is a unit fraction, "R1" indicates a denominator value of the first thinning rate, and "R2" indicates a denominator value of the second thinning rate. In such a calculation equation, for example, "R2" is a value having a decimal fraction (for example, 4.1). As described above, the thinning rate need not be a unit fraction having a denominator value of an integer (for example, 1/4). However, when the thinning rate is a unit fraction having a denominator value of a non-integer (for example, 1/4.1), when linear interpolation processing or adjacent pixel selection processing occurs in the thinning processing, a load of the processing increases. Therefore, the first and second thinning rates are set on the basis of load balance and accuracy of a focus evaluation value.

In addition, in the embodiment, for example, the first and second thinning rates are set so that a difference between a first denominator value of a unit fraction that corresponds to the first thinning rate and a second denominator value of a unit fraction that corresponds to the second thinning rate is less than 1. For example, when the first thinning rate is 1/4, the second thinning rate is set at 1/4.2, 1/3.8. As a result, pieces of accuracy in focus evaluation values are approximated, so that accuracy of the total focus evaluation value is improved.

When the first and second thinning rates are different greatly, the multiplicity of an alias frequency by the thinning processing is also different greatly. When the multiplicity of the alias frequency increases, the number of times of occurrence of cancellation of frequencies also increases. Therefore, when a difference between the first and second thinning rates is large, a difference between pieces of accuracy of the focus evaluation values increases undesirably. Therefore, the focus evaluation value generation apparatus reduces, for example, the difference between the first thinning rate and the second thinning rate.

Alternatively, in the embodiment, for example, the first and second thinning rates are set so that a multiplication value between the first denominator value (for example, 4) of the unit fraction that corresponds to the first thinning rate and the second denominator value (for example, 5) of the unit fraction that corresponds to the second thinning rate becomes a least common multiple between the first denominator value and the second denominator value (for example, 20). As a result, between the plurality of thinning rates, a frequency at which cancellation of signal components occurs is not shared, and an effect that is obtained by generating a plurality of focus evaluation values becomes higher.

Specifically, when the first thinning rate is 1/4, for example, the second thinning rate is set at 1/5, 1/7. For example, in a frequency at which the cancellation of frequency components occurs in the thinning processing of 1/4, cancellation of frequency components occurs even in the thinning processing of 1/8. Therefore, even when a plurality of focus evaluation values are generated on the basis of a plurality of thinning rates, cancellation of signal components occurs in an identical frequency, so that an effect that is obtained by generation on the basis of the plurality of thinning rates is reduced.

In addition, in the embodiment, weighting may be performed on first and second thinning rates. For example, the focus evaluation value generation apparatus according to the embodiment reflects a first weight coefficient to the first focus evaluation value and reflects a second weight coefficient that is smaller than the first weight coefficient to the second focus evaluation value when the first thinning rate (for example, 1/4) is larger than the second thinning rate (for example, 1/5). As a result, accuracy of a focus evaluation value to be generated is further improved.

In this case, for example, higher weighting is performed on the focus evaluation value of the first thinning rate (1/4) at which cancellation of frequency components hardly occurs because the thinning rate is higher. For example, multiplicity of folding of a frequency when the first thinning rate is 1/4 is 3, and multiplicity of folding of a frequency when the second thinning rate is 1/5 is 4. When pieces of multiplicity of folding of a frequency are different, cancellation of frequency components easily occurs in a case of the higher multiplicity.

It is noted that the focus evaluation value generation processing according to the embodiment may be stored in a computer-readable recording medium as a program, and the program may be executed so as to be read by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A focus evaluation value generation apparatus that generates a focus evaluation value that indicates a focusing degree of an optical system of a digital imaging apparatus, the focus evaluation value generation apparatus comprising:

a low frequency image data generator configured to generate low frequency image data that is obtained by extracting a low frequency component from input image data that is obtained by imaging a subject;

a thinned image generator configured to generate thinned input image data of which a number of pixels is smaller than the image data by thinning out a plurality of pixels of the input image data at a rate, and thinned low frequency image data of which a number of pixels is smaller than the low frequency image data by thinning out a plurality of pixels of the low frequency image data at the rate which is same as the rate of the generating of the thinned input image data; and a focus evaluation value generator configured to generate the focus evaluation value based on a difference value between a pixel of the thinned input image data and a pixel of the thinned low frequency image data.

2. The focus evaluation value generation apparatus according to claim 1, wherein the rate includes a plurality of rates, and the focus evaluation value generator generates a total focus evaluation value based on a first focus evaluation value based on first thinned input image data and first thinned low frequency image data that are thinned out at a first rate, and a second focus evaluation value based on second thinned input image data and second thinned low frequency image data that are thinned out at a second rate, as the focus evaluation value.

3. The focus evaluation value generation apparatus according to claim 1, wherein the rate is ½ or more.

4. The focus evaluation value generation apparatus according to claim 2, wherein a difference between denominator values of a unit fraction that corresponds to the first rate and a unit fraction that corresponds to the second rate is less than 1.

5. The focus evaluation value generation apparatus according to claim 2, wherein a value that is obtained by multiplying a first denominator value of the unit fraction that corresponds to the first rate by a second denominator value of the unit fraction that corresponds to the second rate is a least common multiple of the first denominator value and the second denominator value.

6. The focus evaluation value generation apparatus according to claim 1, wherein the digital imaging apparatus includes a display of display image data, and at least one piece of the thinned low frequency image data is image data of a conversion process from the input image data to the display image data that is output to the display.

7. The focus evaluation value generation apparatus according to claim 1, wherein at least one piece of the thinned low frequency image data is image data of a conversion process from the input image data to compression image data that is stored in a storage that is allowed to be accessed by the digital imaging apparatus.

8. The focus evaluation value generation apparatus according to claim 2, wherein the total focus evaluation value is one of a maximum value and an average value of the first and second focus evaluation values.

9. The focus evaluation value generation apparatus according to claim 2, wherein the first rate is increased as compared with the second rate, and a first weight coefficient is reflected to the first focus evaluation value, and a second weight coefficient that is reduced as compared with the first weight coefficient is reflected to the second focus evaluation value.

10. The focus evaluation value generation apparatus according to claim 1, wherein the focus evaluation value is one of a maximum value of an absolute value of the difference value between pixels, a sum value of the absolute values, an average value of the absolute values, a sum value of square values of the difference values between the pixels, and an average value of the square values.

11. The focus evaluation value generation apparatus according to claim 1, wherein the digital imaging apparatus includes a display of display image data, and the focus evaluation value is displayed on the display.

12. A focus evaluation value generation method that generates a focus evaluation value that indicates a focusing degree of an optical system of a digital imaging apparatus, the focus evaluation value generation method comprising:

generating low frequency image data that is obtained by extracting a low frequency component from input image data that is obtained by imaging a subject;

generating thinned input image data of which a number of pixels is smaller than the image data by thinning out a plurality of pixels of the input image data at a rate, and thinned low frequency image data of which a number of pixels is smaller than the low frequency image data by thinning out a plurality of pixels of the low frequency image data at the rate which is same as the rate of the generating of the thinned input image data; and generating the focus evaluation value based on a difference value between a pixel of the thinned input image data and a pixel of the thinned low frequency image data.

13. A non-transitory computer-readable medium storing a focus evaluation value generation program that causes a computer to execute a focus evaluation value generation processing of generating a focus evaluation value that indicates a focusing degree of an optical system of a digital imaging apparatus, the focus evaluation value generation processing comprising:

generating a focus evaluation value based on a difference value between a pixel of thinned input image data that generated by thinning out a plurality of pixels of input image data at a rate, and a pixel of thinned low frequency image data by thinning out a plurality of pixels of low frequency image data at the rate which is same as the rate of the generating of the thinned input image data, the input image data being obtained by imaging a subject, the low frequency image data being generated by extracting a low frequency component from the input image data.

* * * * *